(12) United States Patent
Ghosh et al.

(10) Patent No.: US 12,199,879 B2
(45) Date of Patent: Jan. 14, 2025

(54) NOISY NEIGHBOR IN A CLOUD MULTITENANT SYSTEM

(71) Applicant: VMware LLC, Palo Alto, CA (US)

(72) Inventors: Chandan Ghosh, Bangalore (IN); Anantha Mohan Raj, Bangalore (IN)

(73) Assignee: VMware LLC, Palo Alto, CA (US)

(*) Notice: Subject to any disclaimer, the term of this patent is extended or adjusted under 35 U.S.C. 154(b) by 0 days.

(21) Appl. No.: 17/896,648

(22) Filed: Aug. 26, 2022

(65) Prior Publication Data

US 2024/0073144 A1 Feb. 29, 2024

(51) Int. Cl.
*H04L 47/24* (2022.01)
*H04L 12/46* (2006.01)
*H04L 43/026* (2022.01)
*H04L 43/04* (2022.01)
*H04L 43/062* (2022.01)
*H04L 43/08* (2022.01)

(52) U.S. Cl.
CPC .......... *H04L 47/24* (2013.01); *H04L 12/4641* (2013.01); *H04L 43/026* (2013.01); *H04L 43/04* (2013.01); *H04L 43/062* (2013.01); *H04L 43/08* (2013.01)

(58) Field of Classification Search
CPC ... H04L 47/24; H04L 12/4641; H04L 43/026; H04L 43/04; H04L 43/062; H04L 43/08
See application file for complete search history.

(56) References Cited

U.S. PATENT DOCUMENTS

| 8,850,002 B1* | 9/2014 | Dickinson | H04L 67/1023 709/227 |
|---|---|---|---|
| 10,341,236 B2 | 7/2019 | Boutros et al. | |
| 10,911,360 B2 | 2/2021 | Boutros et al. | |
| 11,171,878 B1* | 11/2021 | Devireddy | G06F 9/5061 |
| 2014/0136690 A1* | 5/2014 | Jain | H04L 67/63 709/224 |
| 2014/0237114 A1* | 8/2014 | Lin | G06F 9/5055 709/224 |
| 2016/0261506 A1* | 9/2016 | Hegde | H04L 45/025 |
| 2020/0235990 A1* | 7/2020 | Janakiraman | H04L 41/0893 |

OTHER PUBLICATIONS

Patrick Kremer, "VMC on AWS Multi-Edge Scenario"; Technical Perspectives from a VMware Cloud Solution Architect, Oct. 14, 2020 (5 pgs) http://www.patrickkremer.com/vmc-on-aws-multi-edge-scenario/.

* cited by examiner

*Primary Examiner* — Anh Nguyen
(74) *Attorney, Agent, or Firm* — Quarles & Brady LLP (57) ABSTRACT

A noisy neighbor in a cloud multitenant system can present resource governance issues. Usage quotas can be applied, and traffic can be throttled to mitigate the problem. Network traffic can be monitored from routers of a software defined data center (SDDC) configured to process network traffic for machines of different tenants. By default, the network traffic from the routers can be processed via a first edge router for the SDDC. A second edge router can be deployed for the SDDC in response to the network traffic from a particular router exceeding a threshold. Network traffic from the particular router can be processed via the second edge router while the remaining traffic can continue to be processed via the first edge router.

15 Claims, 6 Drawing Sheets

NOISY NEIGHBOR IN A CLOUD MULTITENANT SYSTEM

BACKGROUND

A data center is a facility that houses servers, data storage devices, and/or other associated components such as backup power supplies, redundant data communications connections, environmental controls such as air conditioning and/or fire suppression, and/or various security systems. A data center may be maintained by an information technology (IT) service provider. An enterprise may purchase data storage and/or data processing services from the provider in order to run applications that handle the enterprises' business processes and operational data. The applications may be proprietary and used exclusively by the enterprise or made available through a network for anyone to access and use.

A software defined data center (SDDC) can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

SDDCs may be connected to external networks by edge gateways that can incorporate network switches, routers, and middlebox services, such as firewalls, network address translators (NATs), etc. The external traffic is steered through the edge gateways.

DETAILED DESCRIPTION

Some embodiments provide a method for addressing noisy neighbor issues in a public or private SDDC. Some SDDCs can operate as cloud multitenant systems. Multiple tenants (e.g., entities, businesses, departments, etc.), can make use of the resources (e.g., compute, storage, and networking) and services provided by the SDDC. A benefit of multitenant systems is that resources can be pooled and shared among tenants. This can result in lower costs and improved efficiency.

However, noisy neighbor problems are an inherent risk in such systems. In this context, a noisy neighbor occurs when the activity of one tenant has a negative impact (e.g., degraded performance) on another tenant's use of the system. If a single tenant uses a disproportionate amount of resources available in the system, the overall performance of the system can suffer. In most cases, the individual tenants do not mean to cause noisy neighbor issues. Individual tenants may not even be aware that their workloads cause noisy neighbor issues for others.

At least one embodiment of the presently disclosed technology addresses these and other drawbacks of some previous approaches. For example, network traffic in an SDDC can be monitored from a first router configured to process network traffic for machines of a first tenant and a second router configured to process network traffic for machines of a second tenant. First and second routers are also sometimes referred to herein as "tier 1" (T1) or "tenant" routers. Network traffic from the first router and the second router can be processed, by default, via an edge router for the SDDC, sometimes referred to herein as a "tier 0" (T0) or "provider edge" router. The T1 and/or T0 routers can be virtual routers executed by a virtual machine. A second edge router can be deployed for the SDDC in response to the network traffic from the second router exceeding a scale-out threshold. After deployment of the second edge router, network traffic from the first router can continue to be processed via the first edge router of the SDDC And network traffic from the second router can be processed via the second edge router.

Resource usage for the SDDC can be monitored, both overall and for each tenant. Spikes in resource usage can be detected and alerts can be configured to help mitigate known issues by scaling up and/or out by provisioning more infrastructure. Specifically, additional edge routers can be provisioned to handle a spike in network traffic. Resource governance can be applied to avoid a single tenant that is overwhelming the system and reducing capacity available to other tenants. Rate limiting can be used to enforce quotas, such as quality of service (QoS) agreements.

In some embodiments, tenants can be rebalanced across different edge nodes. For example, placing tenants with predictable and similar usage patterns across multiple edge nodes can help flatten peaks in usage. QoS agreements can be enforced by prioritizing some processes or workloads ahead of others. High priority operations can take precedence when there is pressure on the resources of the SDDC.

Elements shown in the figures herein can be added, exchanged, and/or eliminated so as to provide a number of additional embodiments. The proportion and the relative scale of the elements provided in the figures are intended to illustrate certain embodiments, and should not be taken in a limiting sense.

Figure 1:
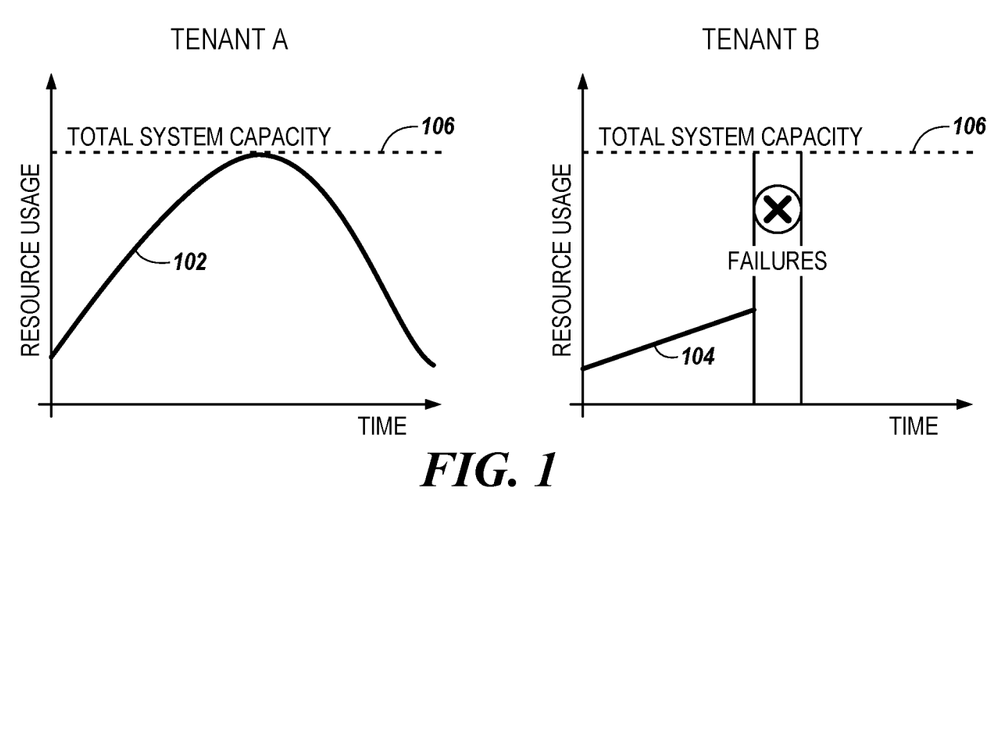
FIG. 1 includes plots of resource usage over time for multiple tenants in an SDDC.

FIG. 1 includes plots of resource usage over time for multiple tenants in an SDDC. The Tenants (Tenant A and Tenant B) share resources of the SDDC. Specifically, in this example, the tenants share network bandwidth. The y-axis of each plot indicates resource usage and the x-axis of each plot represents time, which is the same timeline for both plots. In this example, the plot 102 for Tenant A shows an increase in resource usage over time up to a point near the middle of the plot 102, after which the resource usage over time decreases. The plot 104 for Tenant B shows a more linear and gradual increase in resource usage over time up to a point where failures are indicated. The failures indicated in the plot 104 align in time with where the resource usage over time for Tenant A approaches the total system capacity 106 for the SDDC. In other words, because Tenant A used all, or nearly all, of the resources of the SDDC, Tenant B experienced a failure, making Tenant A a noisy neighbor. At peak times, the total demand for resource usage in the SDDC may be greater than the total system capacity 106. In some previous approaches, whichever tenant's request arrived first may take precedence. The other tenant experiences the noisy neighbor problem. Alternatively, both tenants may find that their performance suffers.

Figure 2:
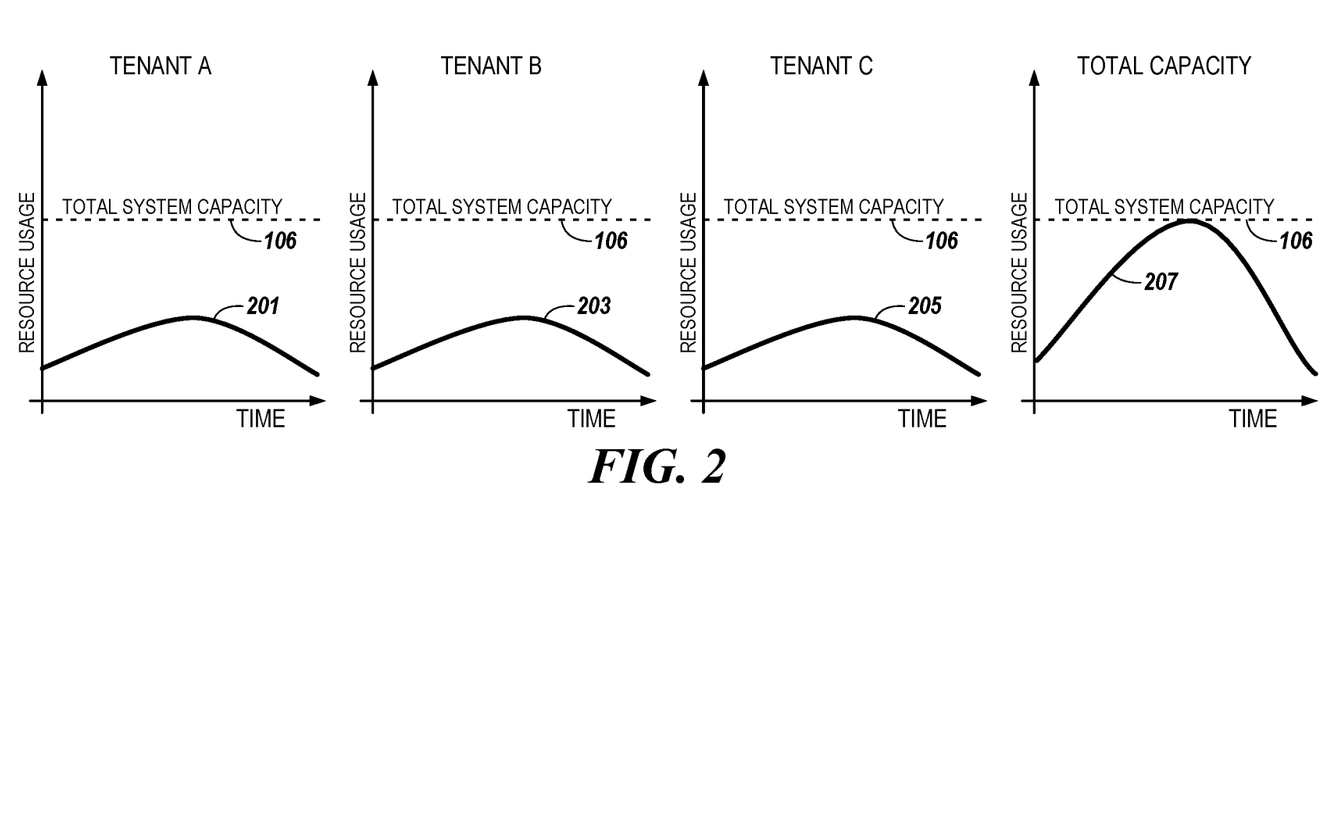
FIG. 2 includes plots of resource usage over time for multiple tenants and the total system in an SDDC.

FIG. 2 includes plots of resource usage over time for multiple tenants and the total system in an SDDC. The noisy neighbor problem can also occur even when each individual tenant is consuming relatively small amounts of the total system capacity 106, but the collective resource usage of many tenants results in a peak in overall usage. This can happen when multiple tenants of the SDDC all have similar usage patterns, or where insufficient capacity has been provisioned for the collective load on the system. In this example, the plots 201 for Tenant A, 203 for Tenant B, and 205 for Tenant C show similar increases in resource usage over time up to a point near the middle of the plots, after which the resource usage over time decreases. The plot 207 shows the resource usage over time for the overall system. As indicated near the middle of the plot 207, the resource usage over time for the overall system reaches the total system capacity 106.

Figure 3:
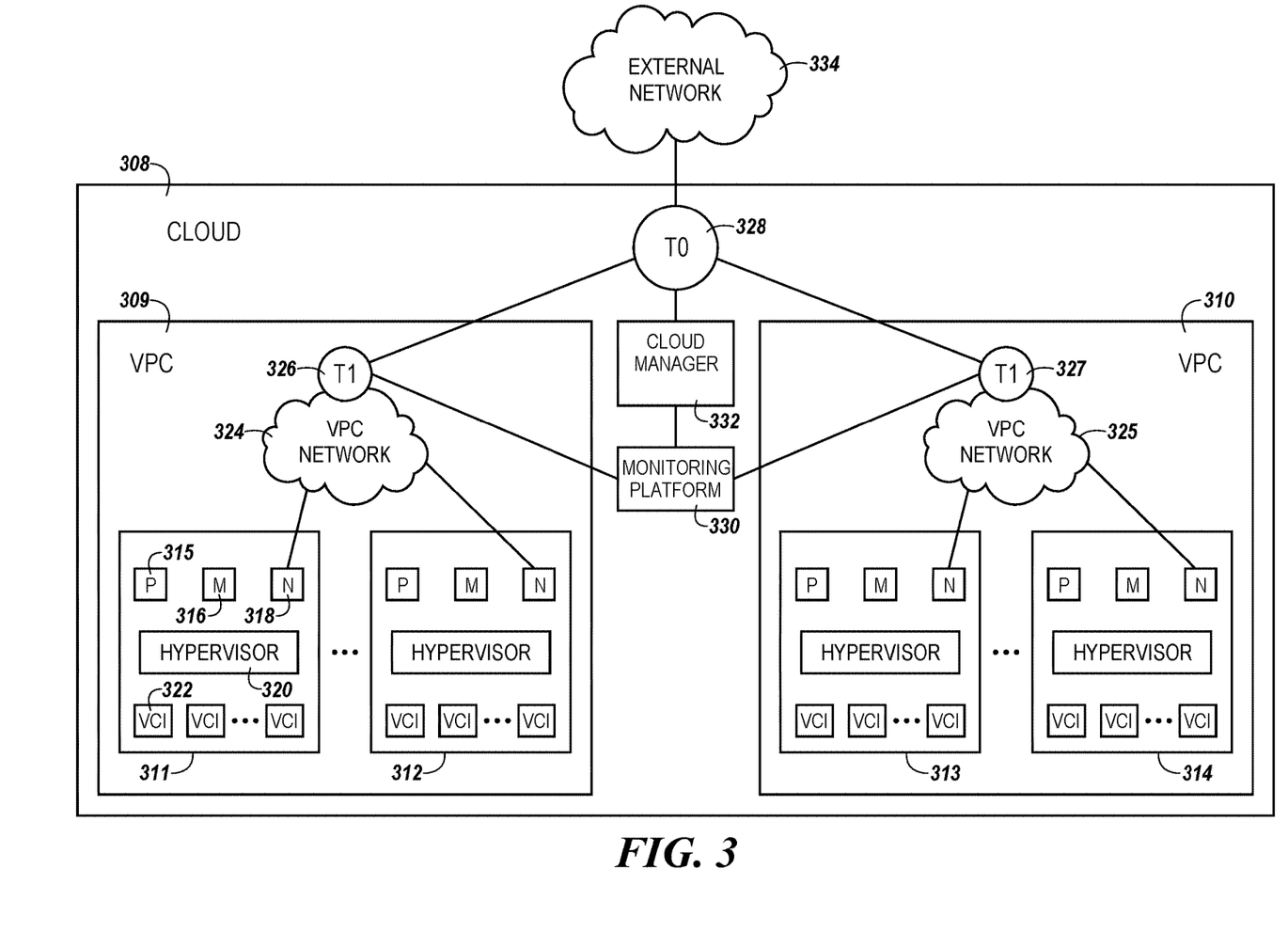
FIG. 3 is a diagram of a cloud multitenant system that includes a noisy neighbor.

FIG. 3 is a diagram of a cloud multitenant system that includes a noisy neighbor. The cloud multitenant system can be provided by an SDDC having a public cloud availability zone, referred to generally herein as a public cloud 308 in which virtual private clouds (VPCs) 309, 310 have been defined for different tenants. An availability zone in some embodiments includes one data center or more than one data center that are near each other. Although the use of some embodiments are described with respect to a public cloud, it should be appreciated that similar benefits can be realized when implemented in private datacenters. The VPCs can also be referred to as private, proprietary, or hybrid clouds. The VPCs can be segregated private physical networks or logical overlay networks. The term "public cloud" refers to computing services offered publicly over the Internet.

A first VPC 309 includes machines of a first tenant comprising hosts 311, 312, which may include virtual computing instances (VCIs) and a first router 326 configured to process network traffic for the machines of the first tenant. A second VPC 310 includes machines of a second tenant including hosts 313, 314, which may include VCIs and a second router 327 configured to process network traffic for the machines of the second tenant. For each tenant, the respective VPC includes a private network 324, 325, which may include switches, routers, and other devices, only one of which is shown. The routers 326, 327 may each include software switches, routers, and/or middleboxes. Middleboxes may include firewalls, load balancers, etc., implemented in software executing on multi-tenant host computers along with VCIs that have been deployed for the respective tenants. The routers 326, 327 may each include hardware routers, switches, and/or middleboxes (e.g., hardware switching and/or router appliances, and/or middlebox appliances). The VPCs can include intervening routers (not shown) that can be configured with next-hop forwarding rules or a set of tunnels that eventually connect to the edge router 328.

The term "machines" can include physical computers or VCIs. The term "VCI" covers a range of computing functionality, such as virtual machines, virtual workloads, data compute nodes, clusters, and containers, among others. A virtual machine is an isolated environment created by virtualizing a set of hardware including processor, memory, network, and storage resources. The virtual machine is capable of executing system-level software such as an operating system alongside other virtual machines on a single physical computer. A container refers generally to an isolated user space instance, which can be executed within a virtualized environment. Containers run on top of a host operating system without a hypervisor or inside a virtual machine.

Hosts can include processor(s), memory such as dynamic random access memory, and one or more network interfaces. For example, host 311 includes processor(s) 315, memory 316, and network interface(s) 318. Although two hosts are shown in each VPC, any number of hosts can reside in each VPC. The SDDC can extend virtualization concepts such as abstraction, pooling, and automation to data center resources and services to provide information technology as a service (ITaaS). In the SDDC, infrastructure, such as networking, processing, and security, can be virtualized and delivered as a service. The SDDC can include software defined networking and/or software defined storage. In some embodiments, components of the SDDC can be provisioned, operated, and/or managed through an application programming interface (API) exposed by a controller (not shown in FIG. 3).

Each host can incorporate a hypervisor that can execute a respective number of VCIs. For example, the host 311 incorporates a hypervisor 320 that executes at least one VCI 322. The VCIs can be provisioned, using virtualization technologies, with processing resources, i.e., an allocation of processing cores or a portion of processor execution time and/or memory resources, and can communicate via a network interface. Memory, such as a machine-readable medium (MRM), can be internal and/or external to the device using it. Memory can store program instructions. Program instructions may also be referred to as software or machine-readable instructions (MRI) to implement a particular function. The MRI can be executable by a processor.

Memory can be non-transitory and can include volatile and/or non-volatile memory. Volatile memory can include memory that depends upon power to store information, such as various types of dynamic random access memory among others. Non-volatile memory can include memory that does not depend upon power to store information. Examples of non-volatile memory can include solid state media such as flash memory, electrically erasable programmable read-only memory, phase change memory, three-dimensional cross-point, ferroelectric transistor random access memory, ferroelectric random access memory, magneto random access memory (MRAM), spin transfer torque (STT)-MRAM, conductive bridging RAM, resistive random access memory (RRAM), oxide based RRAM, negative-or (NOR) flash memory, magnetic memory, optical memory, and/or a solid state drive, etc., as well as other types of machine-readable media.

In some embodiments, a private network is established by sharding the internal network address space of the private cloud, and providing a set of internal network addresses to the private network that does not overlap with the internal network addresses provided to any other tenant of the VPC. In other embodiments, a private network is a logical overlay network that is formed by establishing tunnels between the routers of the private network and having the routers exchange data messages through these tunnels (e.g., by encapsulating the data messages with tunnel headers that allow the data messages to be exchanged between the routers) while preserving the original data message headers that contain network addresses defined in the logical address space. In some embodiments, the logical address space of one tenant might overlap with the logical address space of another tenant but this does not matter because of the encapsulating tunnel headers.

An edge router 328 is configured to process network traffic from the first router 326 and the second router 327. The edge router 328 (which may be referred to as a "tier zero" or T0, or provider edge router) may be initially deployed by a cloud manager 332 to connect the VPC networks 324, 325 with the external network 334. In this example, the routers 326, 327 of the VPCs 324, 325 (e.g., VPC routers) connect to the external network 334 via the edge router 328 of the public cloud 308. Cloud manger 332 may be or include a management and/or control plane that comprises one or more applications running within a physical or virtual machine, or in one or more containers hosted within public cloud 308 or elsewhere. Alternatively, cloud manger 332 may be a management and/or control plane formed by a cluster of machines residing within public cloud 308 or elsewhere, and may be distributed in one or more hosts. In some embodiments, the cloud manager 332 configures the edge router 328 to forward ingress data messages to the VPC networks 324, 325 from the external network 334, and egress data messages from the VPC networks 324, 325 to the external network 334. The cloud manager 332 can configure the routers 326, 327 in the VPC networks 324, 325 to forward the egress data message to the edge router 328, and the ingress data messages to the machines of the VPC networks 324, 325.

Applications can have large flows that transmit or receive large amounts of data to or from the external network 334. If the bandwidth available for communicating to or from external network 334 is oversubscribed, tenants may experience packet drops and/or reduced network performance. The bandwidth can be oversubscribed in some instances due in part to a noisy neighbor, i.e., a tenant using a disproportionate share of the bandwidth. From the non-noisy tenant's perspective, the noisy neighbor problem can manifest as failed server requests or requests that take a long time to complete. For example, if the same request succeeds at other times and appears to fail randomly, there may be a noisy neighbor issue. From a service provider's perspective, the noisy neighbor issue may appear in several ways. Examples include spikes in resource usage and failures when performing an operation for a tenant, even when that tenant is not using a large portion of the system's resources. Such a pattern may indicate that the tenant is a victim of the noisy neighbor problem. Although not specifically illustrated with respect to FIG. 3, the tenant associated with the VPC 310 is the noisy neighbor and the tenant associated with the VPC 309 is the victim. Previous approaches to multitenant SDDCs do not have a solution that allows the cloud manager 332, which manages bandwidth allocation across tenants, to address the noisy neighbor problem. This can result in packet loss, degraded performance, and/or a bad customer experience.

However, at least one embodiment includes the use of a monitoring platform 330. Providers can define a maximum bandwidth allocation per T1 router for each tenant by performing rate limiting on the T1 router. The rate limiting information can be passed to the monitoring platform 330 as a parameter. The monitoring platform 330 can be configured to monitor traffic (e.g., the bandwidth usage) from the first router 326 and the second router 327. For example, routers 326, 327 may be configured to send telemetry data to monitoring platform 330 using a management protocol such as Simple Network Management Protocol (SNMP). More specifically, the traffic between the routers 326, 327 and the edge router 328 can be monitored for each tenant. The monitoring platform 330 can be configured to alert the cloud manager 332 in response to network traffic from either the first router 326 or the second router 327 exceeding a respective scale-out threshold. The monitoring platform 330 can generate an alert in response to the parameter being exceeded for any router (e.g., when the actual bandwidth consumed is greater than the rate limit). The alert can be sent to the cloud manager 332 and thereby trigger a workflow in the cloud manger 332 (e.g., a microservice) that can create additional edge routers (see FIG. 4) using a multi-edge feature of the public cloud 308.

Figure 4:
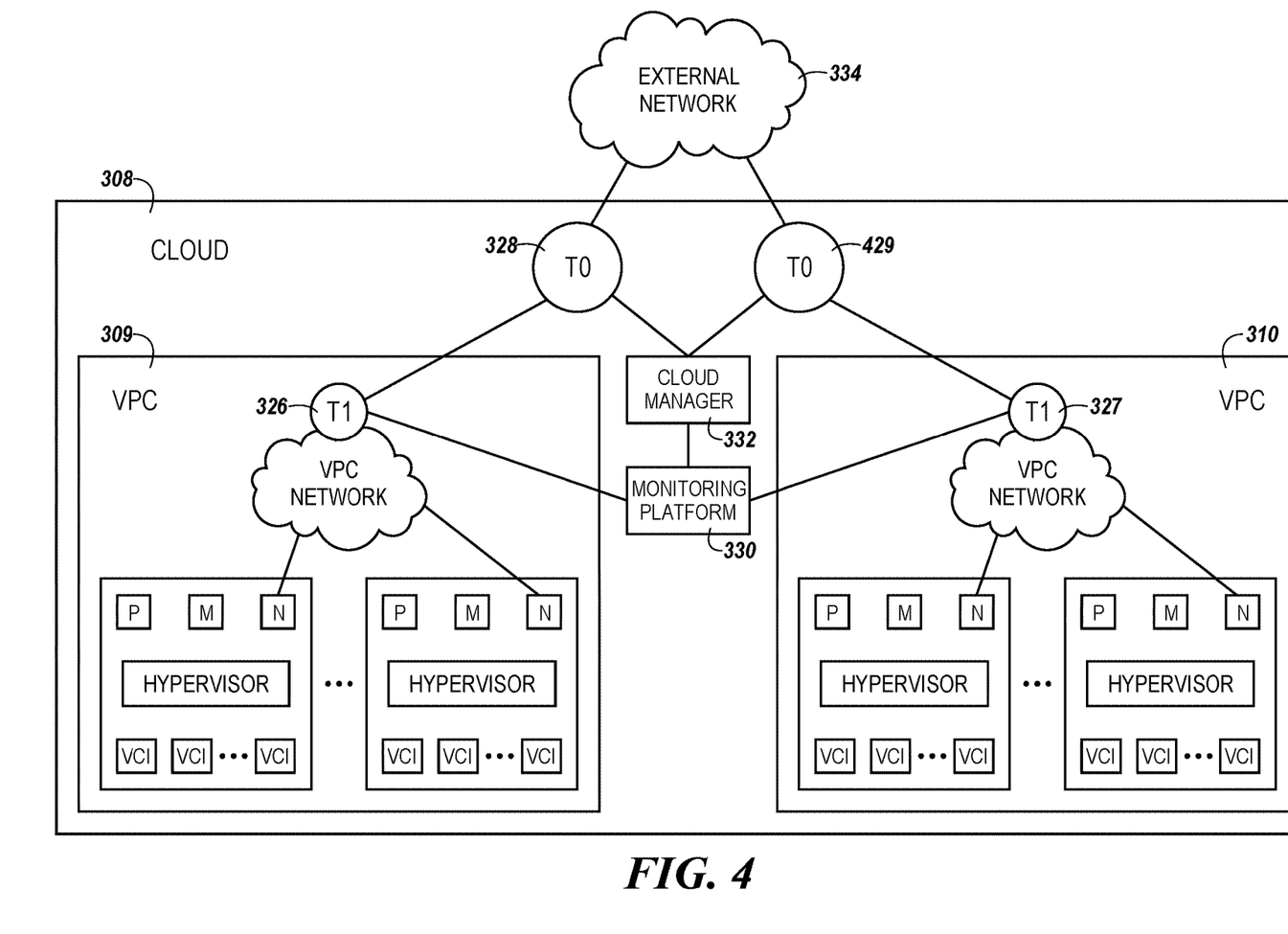
FIG. 4 is a diagram of the cloud multitenant system having an additional edge router provisioned.

FIG. 4 is a diagram of the cloud multitenant system having an edge router 429 provisioned in addition to the edge router 328. The edge router 428 may also be referred to as a second edge router, an additional edge router, or a scaled out edge router. In response to receiving the alert from the monitoring platform 330, the cloud manger 332 can be configured to deploy a second edge router 429. The second edge router 429 is configured to process network traffic from the router 327 that exceeds the scale-out threshold.

Each router 326, 327 can be configured to send telemetry data to the monitoring platform 330. The telemetry data can include bandwidth consumption data for the network traffic for that router. The monitoring platform 330 can be configured to receive a definition of the respective scale-out threshold for each router based on a QoS to be provided for the respective tenant. The scale-out thresholds can be stored in a data store associated with the monitoring platform 330 and/or the cloud manager 332. The scale-out thresholds can be set for different tenants, different workloads for different tenants, and/or at other granularities. The scale-out thresholds (and thus the QoS policy that they represent) can be enforced at the router 326, 327 level rather than the edge router 328, 429 level. For example, the routers 326, 327 can be configured to drop packets associated with network traffic that exceeds a given scale-out threshold. The monitoring platform 330 can be configured to receive the telemetry data and raise an alert in response to traffic for a given router 326 exceeding a scale-out threshold.

In some embodiments, the monitoring platform 330 can be configured to alert the respective tenant in response to network traffic from a corresponding one of the routers 326, 327 exceeding the respective scale-out threshold. This alert can be in addition to or in lieu of the alert to the cloud manger 332. The tenant can specify whether the additional edge router 429 is to be automatically provisioned by the cloud manager 332 upon the scale-out threshold being exceeded, or whether the tenant is to be notified and provide manual approval before the provisioning occurs. In various embodiments, the tenant will be charged an amount of money for the provisioning of the additional edge router 429 and therefore may want to decide whether to accept the additional cost or accept the reduced performance. In the event that a tenant decides to accept the reduced performance, that tenant's traffic can be throttled so that other tenants do not suffer the noisy neighbor problem. For example, one tenant's traffic can be throttled to provide a guaranteed QoS for another tenant. If a tenant agreed to have an additional edge router 429 provisioned, then the alert can be forwarded to the cloud manager 332 if it has not already been sent thereto.

The tenant can selectively enable or disable automatic provisioning of the scaled out edge router 429. The tenant can define a maximum quantity of scaled out edge routers that can be provisioned automatically, after which the provisioning of each additional edge router would require manual approval from the tenant. The tenant can therefore selectively control exposure to additional costs associated with provisioning additional edge routers. The tenant can set time windows during which additional edge routers can be provisioned automatically and when manual approval is required. For example, a tenant hosting an online store on the public cloud 308 may wish to have automatic provisioning available on an expected busy shopping day for the tenant's customers.

In some embodiments, traffic for a tenant can be assigned to different traffic groups. Using more than one traffic group for a tenant can be beneficial when more than one edge router is used to process network traffic of the tenant. For example, each traffic group can be associated with a respective one of the edge routers so that the same edge router can process ingress and egress data messages flows for the same VCIs. The edge router can maintain state and/or perform stateful middlebox services for VCIs of the traffic group. Traffic for a particular traffic group can span multiple VCIs across multiple hosts. In other words, there is not necessarily a correlation between hosts or VCIs and traffic groups. Traffic from different VCIs of a tenant can be assigned to different traffic groups without regard to which host is executing any particular VCI. The monitoring platform 330 can determine how many traffic groups should be used to handle the traffic for the tenant. The determination can be based on the network bandwidth being consumed by the VCIs of the tenant and/or how many edge routers are or will be used for the tenant. Traffic for the VCIs of the tenant can be load balanced across the traffic groups.

Network interfaces can have different network addresses for connecting the VCIs to routers in the VPC network. The monitoring platform 330 can identify network address prefixes associated with network traffic that exceeds the scale-out threshold. The monitoring platform 330 can create a prefix list using the identified network address prefixes and associate that prefix list with a particular traffic group. Different traffic groups can be associated with different prefix lists. The monitoring platform 330 and/or the cloud manager 332 can create an association map that correlates respective prefix lists with respective traffic groups. The association map can be used by routers the VPC networks and/or edge routers to process network traffic from a particular network address according to the assigned traffic group.

After the edge router 429 has been deployed, the monitoring platform 330 can continue to monitor traffic for the routers 326, 327. The monitoring platform 330 can determine whether traffic from either router 326, 327 exceeds a scale-out threshold, and provision additional edge routers for a tenant if necessary.

The monitoring platform 330 can also be configured to detect a trigger event with respect to the network traffic from the edge routers 328, 429. One example of such a trigger event is determining that bandwidth usage of a tenant, for which a scaled out edge router 429 has previously been deployed, has fallen below a scale-in threshold. That determination can be made, for example, by identifying that network address prefixes associated with a traffic group of the tenant are consuming less bandwidth than the scale-in threshold. The monitoring platform 330 can be configured to notify the cloud manager 332 of the trigger event. The cloud manager 332 and/or the monitoring platform 330 can be configured to scale down the VPC 310 for the tenant by dissociating network addresses for VCIs from one or more traffic groups, removing prefixes from the prefix list, and/or removing one or more traffic groups. In response to receiving the notification of the trigger event from the monitoring platform 330, the cloud manager 332 can release the scaled out edge router 429, such that traffic for the tenant is processed by the router 327 and the default edge router 328. The scale-in threshold can be less than the scale-out threshold so that the cloud 308 does not ping pong between having additional edge routers being deployed and released in short succession due to bandwidth usage fluctuations of a tenant.

Definitions of scale-out thresholds, scale-in thresholds, and trigger events can be stored in a data store associated with the monitoring platform 330 and/or cloud manager 332. The bandwidth monitor 330 can receive these definitions from the data store. An example of the definition of the trigger event is a reduction, by a defined amount, in the network traffic that previously exceeded the respective scale-out threshold. Another example is a reduction in the network traffic that previously exceeded the respective scale-out threshold combined with a manual input from the tenant. In some cases, it can be beneficial not to automatically release the edge router 429 in response to a reduction in traffic because the reduction could be temporary. This could lead to a new edge router needing to be provisioned again. The tenant may expect to experience increased network traffic in the near future (e.g., a week-long conference may be occurring, where daily traffic is expected to exceed the threshold or a big shopping event for an online store provided by the tenant's machines may be approaching). The tenant may be willing to continue to pay to have the scaled out edge router 429 provisioned for a longer period of time than is absolutely necessary to prevent future slowdowns while another edge router is provisioned. Another example of the trigger event is a predefined duration of time having elapsed since the scaled out edge router 429 was provisioned.

Figure 5:
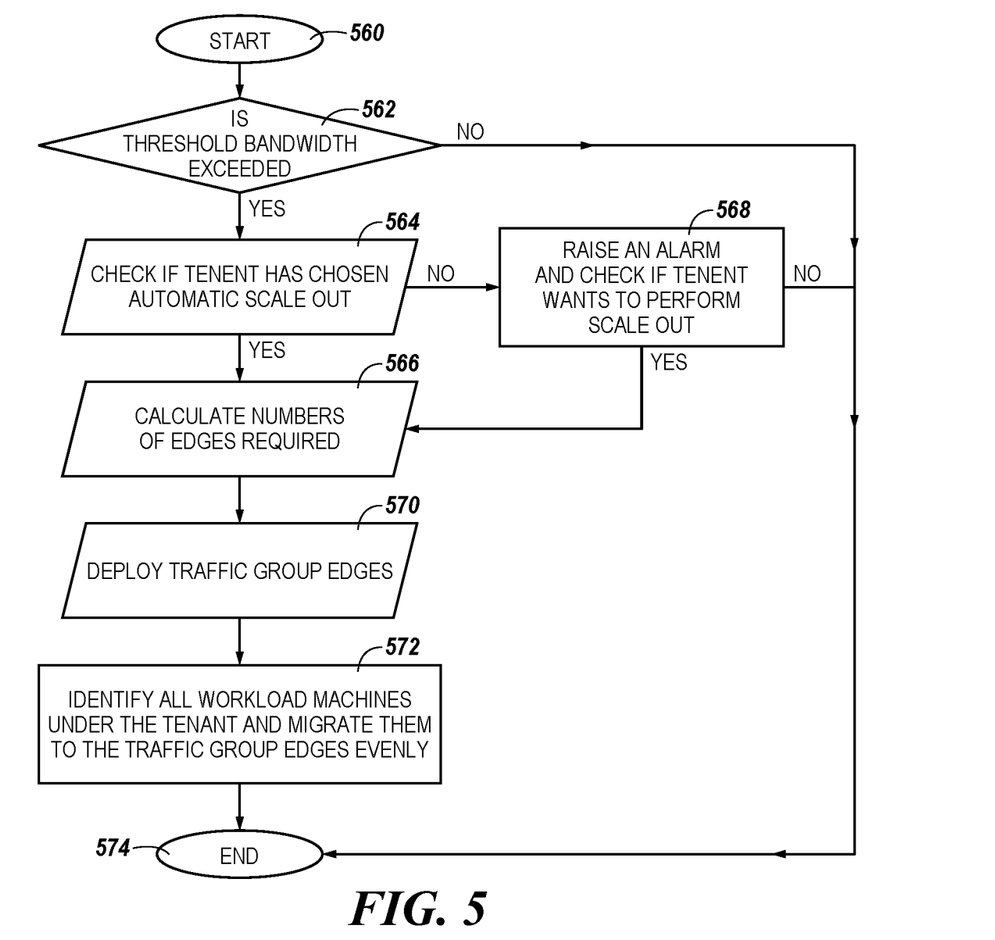
FIG. 5 is a flow chart for addressing a noisy neighbor in a cloud multitenant system.
Figure 6:
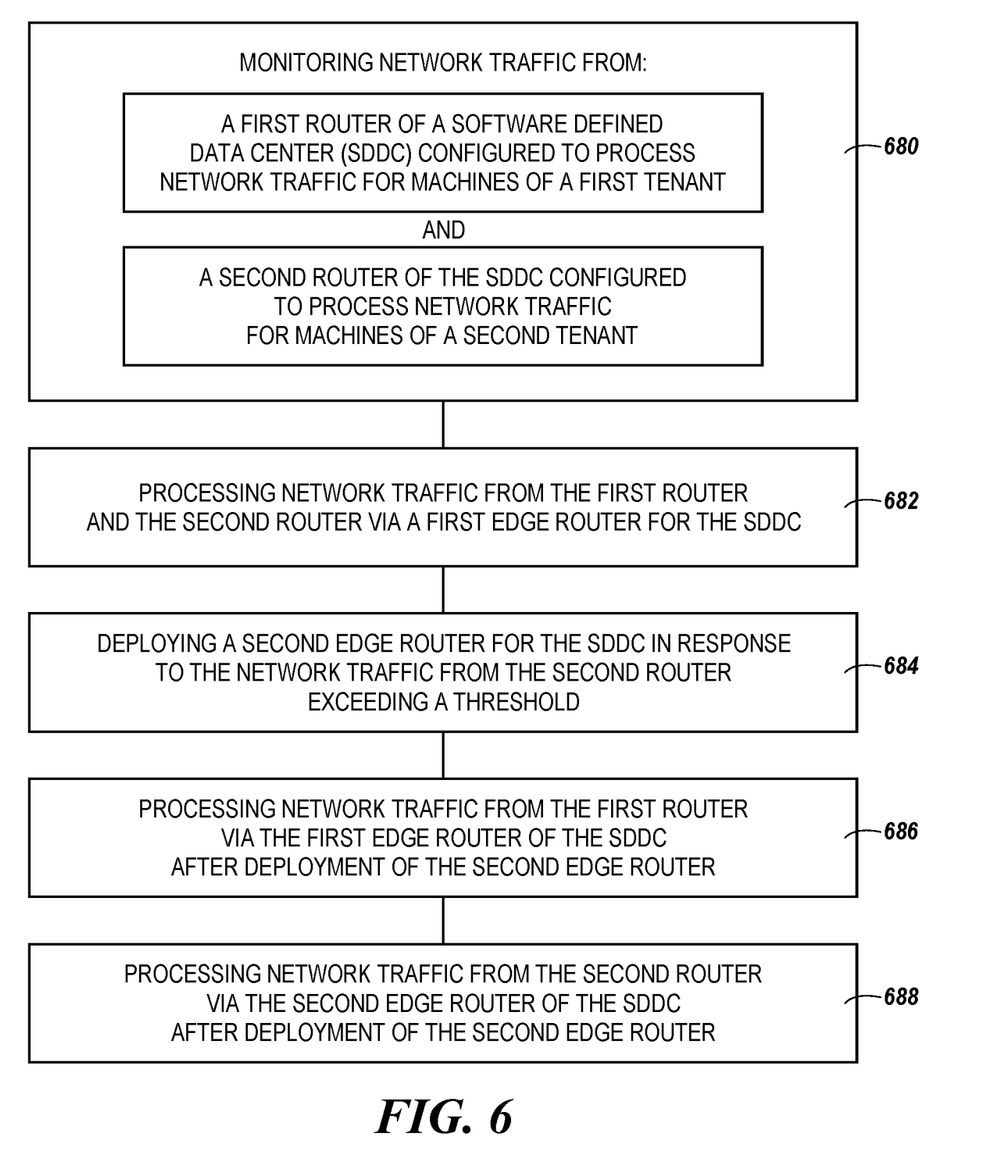
FIG. 6 is a flow chart for addressing a noisy neighbor in a cloud multitenant system.

FIG. 5 and FIG. 6 illustrate flow charts for various methods. The methods can be performed by processing logic that can include hardware, software, or a combination thereof. Examples of such hardware include a processor, circuitry, dedicated logic, programmable logic, an application specific integrated circuit, etc. Examples of such software include instructions run or executed on a processor. The methods can be performed by a server, such as cloud manager 332 and/or monitoring platform 330, though embodiments are not so limited. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 5 is a flow chart for addressing a noisy neighbor in a cloud multitenant system. Beginning at 560, a monitoring platform can determine whether a threshold bandwidth has been exceeded as indicated at 562. If the threshold is not exceeded, the flow ends at 574. Although not specifically illustrated, after 574, the flow can automatically return to the start at 560. If the threshold is exceeded, it can be determined whether the tenant whose traffic exceeds the threshold has chosen to automatically scale out an additional edge router, as indicated at 564. If the tenant has not chosen automatic scale out, an alarm can be raised to check whether the tenant wants to perform the scale up, as indicated at 568. If the tenant does not want to provision an additional edge router, the method ends at 574.

If the tenant has either chosen automatic scale out or if the tenant approves of the scale out per the alert, the monitoring platform can calculate a number of additional edge routers sufficient to handle the additional traffic from the tenant, as indicated at 566. The additional edge routers can be deployed, as indicated at 570. In some embodiments, different traffic groups can be associated with the different edge routers. The machines of the tenant can be identified, and their workloads (network traffic) can be migrated evenly across the edge routers and/or traffic groups, as indicated at 572. The method can end, as indicated at 574.

FIG. 6 is a flow chart for addressing a noisy neighbor in a cloud multitenant system. As indicated at 680, the method can include monitoring network traffic from a first router of an SDDC configured to process network traffic for machines of a first tenant and from a second router of the SDDC configured to process network traffic for machines of a second tenant. As indicated at 682, the method can include processing network traffic from the first router and the second router via a first edge router for the SDDC.

As indicated at 684, the method can include deploying a second edge router for the SDDC in response to the network traffic from the second router exceeding a threshold. In some embodiments, the second edge router can be deployed automatically in response to the network traffic from the second router exceeding the threshold. In some embodiments, the second tenant can be alerted in response to the network traffic from the second router exceeding the threshold. In such embodiments, the second edge router can be deployed further in response to receiving authorization from the second tenant. Although not specifically illustrated, the method can also include storing a definition of a respective threshold for network traffic for the first router and the second router. The monitoring portion of the method indicated at 680 can be performed with respect to the respective thresholds. A cost of the first edge router can be allocated to the first tenant and the second tenant because during at least a portion of the time in which the first edge router was in operation, the first tenant and the second tenant made use of the first edge router. That cost may be prorated based on relative amounts of bandwidth usage, relative amounts of time during which the respective tenants used the first edge router, according to QoS agreements, and/or by some other metric. A cost of the second edge router can be allocated exclusively to the second tenant because, in this example, only the second tenant makes use of the second edge router.

As indicated at 686, the method can include processing network traffic from the first router via the first edge router of the SDDC after deployment of the second edge router. As indicated at 688, the method can include processing network traffic from the second router via the second edge router for the SDDC after deployment of the second edge router.

Although not specifically illustrated, the method can include determining a quantity of additional edge routers sufficient to process the network traffic from the second router, deploying the quantity of additional edge routers for the SDDC, and processing network traffic from the second router via the second edge router and the quantity of additional edge routers after deployment thereof. Traffic groups can be defined, each corresponding to a respective one of the second edge router and the quantity of additional edge routers. The method can include receiving a predefined constraint on the quantity of additional edge routers deployable for the second tenant and deploying the quantity of additional edge routers limited by the predefined constraint. For example, the second tenant can specify an upper limit on how many additional edge routers for which the second entity is willing to pay. The predefined constraint can be received along with a definition of a predefined timeframe. The quantity of additional edge routers can be deployed as limited by the predefined constraint and/or the predefined timeframe. For example, the second tenant can set a limit on a duration of the deployment of any additional edge routers to help control costs.

Although not specifically illustrated, the method can include detecting a trigger event with respect to the network traffic from the second router (after deployment of the second edge router). Network traffic from the second router can be processed via the first edge router in response to the trigger event being detected. The second edge router can be released from the SDDC.

As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
monitoring network traffic from:
 a first router of a software defined data center (SDDC) configured to process network traffic for machines of a first tenant; and
 a second router of the SDDC configured to process network traffic for machines of a second tenant;
processing network traffic from the first router and the second router via a first edge router for the SDDC;
deploying a second edge router for the SDDC in response to the network traffic from the second router exceeding a threshold;
processing network traffic from the first router via the first edge router of the SDDC after deployment of the second edge router;
processing network traffic from the second router via the second edge router for the SDDC after deployment of the second edge router; and
defining a plurality of traffic groups, each corresponding to a respective one of the edge routers so that the same edge router can process ingress and egress data messages flows for the same virtual computing instances (VCIs), the same edge router being configured to maintain state and perform stateful middlebox services for VCIs of a traffic group.

2. The method of claim 1, further comprising allocating a cost of the first edge router to the first tenant and the second tenant; and
allocating a cost of the second edge router exclusively to the second tenant.

3. The method of claim 1, further comprising storing a definition of a respective threshold for network traffic for the first router and the second router; and
monitoring network traffic in the SDDC with respect to the respective threshold.

4. The method of claim 3, further comprising detecting a trigger event with respect to the network traffic from the second router;
processing network traffic from the second router via the first edge router in response to detecting the trigger event; and
releasing the second edge router from the SDDC.

5. The method of claim 1, wherein deploying the second edge router comprises deploying the second edge router automatically in response to the network traffic from the second router exceeding the threshold.

6. The method of claim 1, further comprising alerting the second tenant in response to the network traffic from the second router exceeding a threshold; and
wherein deploying the second edge router comprises deploying the second edge router further in response to receiving authorization from the second tenant.

7. The method of claim 1, further comprising determining a quantity of additional edge routers sufficient to process the network traffic from the second router;
deploying the quantity of additional edge routers for the SDDC; and
processing network traffic from the second router via the second edge router and the quantity of additional edge routers after deployment of the second edge router.

8. The method of claim 7, further comprising receiving, from the second tenant, a predefined constraint on the quantity of additional edge routers deployable for the second tenant; and
deploying the quantity of additional edge routers limited by the predefined constraint.

9. The method of claim 8, further comprising receiving the predefined constraint with a definition of a predefined timeframe; and
deploying the quantity of additional edge routers limited by the predefined constraint and the predefined timeframe.

10. A non-transitory machine-readable medium having instructions stored thereon which, when executed by a processor, cause the processor to:
monitor network traffic from:
a first router of a software defined data center (SDDC) configured to process network traffic for machines of a first tenant; and
a second router of the SDDC configured to process network traffic for machines of a second tenant;
wherein network traffic from the first router and the second router is to be processed via a first edge router for the SDDC;
deploy a second edge router for the SDDC in response to the network traffic from the second router exceeding a threshold;
define a plurality of traffic groups, each corresponding to a respective one of the edge routers so that the same edge router can process ingress and egress data messages flows for the same virtual computing instances (VCIs), the same edge router being configured to maintain state and perform stateful middlebox services for VCIs of a traffic group;
wherein network traffic from the first router is to be processed via the first edge router of the SDDC after deployment of the second edge router; and
wherein network traffic from the second router is to be processed via the second edge router for the SDDC after deployment of the second edge router.

11. The medium of claim 10, further comprising instructions to:
detect a trigger event with respect to the network traffic from the second router subsequent to deployment of the second edge router; and
release the second edge router in response to detection of the trigger event.

12. The medium of claim 11, further comprising instructions to receive a definition of the trigger event from the second tenant.

13. The medium of claim 12, wherein the definition of the trigger event comprises a reduction, by a defined amount, in the network traffic that exceeded the respective threshold.

14. The medium of claim 12, wherein the definition of the trigger event comprises a reduction in the network traffic that exceeded the respective threshold combined with a manual input from a corresponding one of the first tenant and the second tenant.

15. The medium of claim 12, wherein the definition of the trigger event comprises a duration of time.

* * * * *